March 28, 1950 W. DENNIS 2,502,251
APPARATUS FOR THE SEPARATION OF GASEOUS MIXTURES
Filed Dec. 13, 1946
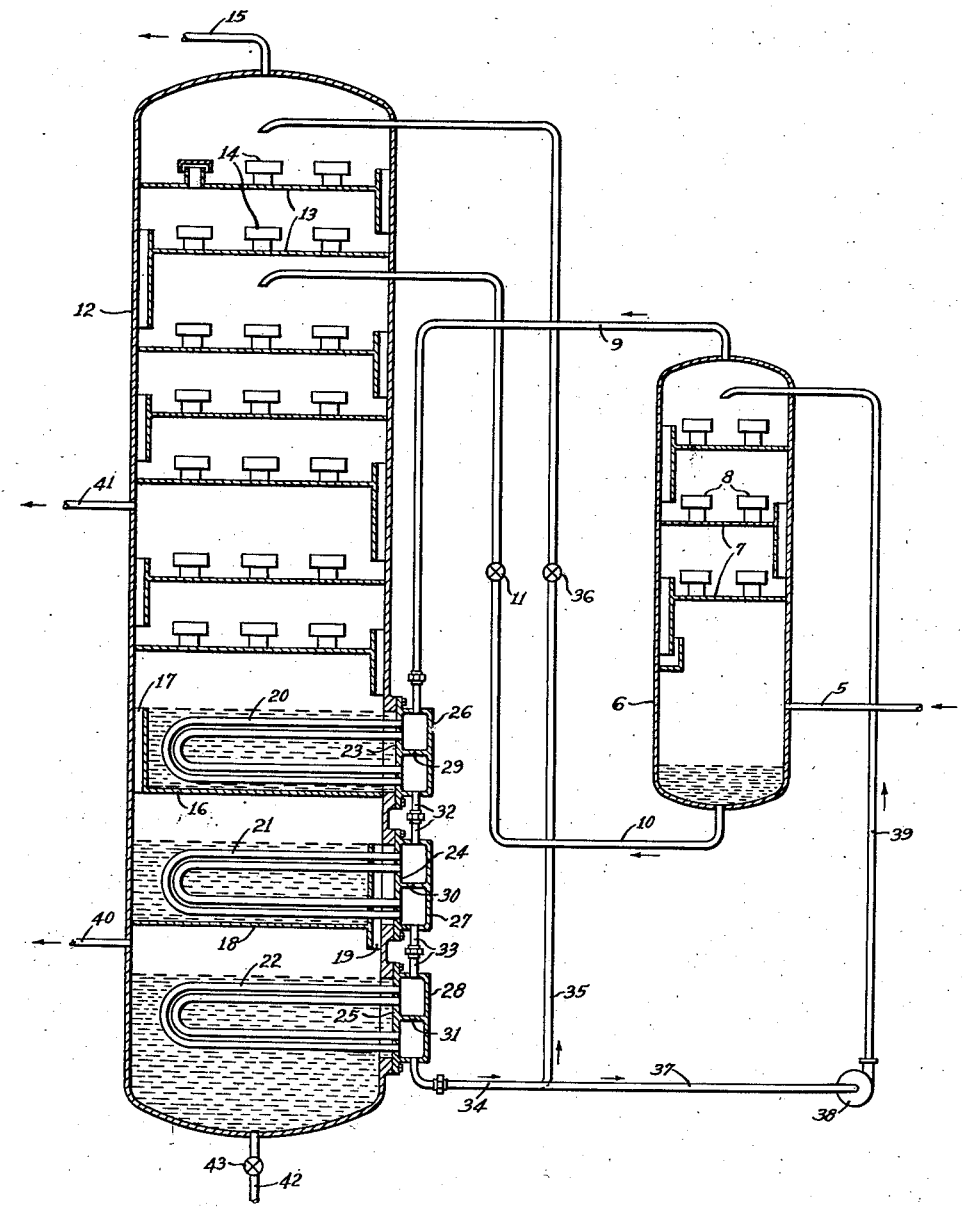
INVENTOR
Wolcott Dennis
BY
Pennie Edmonds Morton & Barrows
ATTORNEYS Patented Mar. 28, 1950

2,502,251

UNITED STATES PATENT OFFICE 2,502,251

APPARATUS FOR THE SEPARATION OF GASEOUS MIXTURES

Wolcott Dennis, Darien, Conn., assignor to Air Reduction Company, Incorporated, New York, N. Y., a corporation of New York Application December 13, 1946, Serial No. 715,930

4 Claims. (Cl. 62—175.5)

This invention relates to apparatus for the liquefaction and rectification of air for the purpose of separating the constituents thereof and particularly to improvements in such apparatus designed to handle large volumes of air and to produce oxygen for industrial applications.

There have been many suggested applications of oxygen in the industrial field in which large volumes of oxygen would be consumed. Little actual development has occurred because of the cost of oxygen as produced in the present commercial installations. Production of oxygen on the scale of 100 to 1000 tons per day will permit material reduction of cost, but it involves many problems related to the size of the apparatus which must be constructed to handle efficiently the necessary volume of air to be treated.

It is the object of the present invention to provide improvements which will materially facilitate the handling and maintenance of large volume oxygen installations.

Another object of the invention is the provision of apparatus in which the condensers necessarily employed can be installed and removed without completely dismantling the column.

Other objects and advantages of the invention will be apparent as it is better understood by reference to the following specification and the accompanying drawing, which illustrates diagrammatically an improved column for the treatment of air and the recovery of oxygen therefrom.

The invention is concerned with apparatus for handling air and the products of separation thereof in large volume and especially with condensers used to effect liquefaction of nitrogen which is required as a reflux in rectification. Heretofore such condensers have consisted generally of a multiplicity of vertically arranged copper tubes suitably connected to headers and adapted to permit upward flow of gases and the return flow of condensate. These are expensive to construct and repair and are not adapted for use in large scale apparatus.

To avoid this difficulty, I have devised condensers which are disposed horizontally in the column and adapted for insertion and removal through the wall thereof. The condenser tubes are submerged in liquid, and to avoid the difference in temperature at the top and bottom of a substantial column of liquid due to hydrostatic head, the condenser tubes are disposed in trays in which liquid accumulates and from which it overflows so that all of the trays are filled with liquid. The depth of liquid on each tray is such that no substantial variation of temperature of the liquid is met in the successive trays.

The trays are so arranged that adequate space is allowed between the sides of the trays, which have a rectangular plan, and the column shell for free passage of vapors upward from lower points in the column. The pressure of the vapor space is thereby maintained at the same value over all trays and the lowest pool of liquid.

The effect of hydrostatic head may be illustrated as follows: Assume a large column, say 10 feet diameter and requiring 10 feet depth of liquid to cover the heat transfer surface. The pressure due to hydrostatic head of liquid oxygen would be 5 p. s. i. resulting in an increase of 3° C. in the boiling point of liquid oxygen at the bottom of the pool over the boiling point at the top of the pool.

In good design the temperature of the condensing nitrogen should be of the order of 3° C. warmer than the boiling point of the liquid oxygen at the surface of the pool. If the lower portions of the pool have a boiling point 3° C. higher than the upper portion of the pool as in the foregoing example, no temperature difference would exist between the condensing nitrogen and the boiling oxygen at the bottom of the pool. In this event the lower condenser surface would become inoperative, necessitating the use of a higher condensing pressure.

Referring to the drawing, air, after compression to a suitable pressure, i. e. 5 atmospheres or more, and cooling in the usual intercoolers and exchangers (not shown) is introduced through a pipe 5 to an auxiliary column 6 having the usual trays 7 and caps 8. The air passes upwardly through the trays in contact with liquid nitrogen provided as hereinafter explained. As the result of rectification, an enriched oxygen liquid collects at the bottom of the auxiliary column 6, and an effluent, consisting of nitrogen, is withdrawn at the top of the column through a pipe 9.

The liquid from the auxiliary column 6, which operates at the initial pressure of the gaseous mixture, is withdrawn through a pipe 10 and pressure reducing valve 11 and is delivered to an intermediate level of the primary column 12 having the usual trays 13 and caps 14. Flowing downwardly over the lower trays of the column, the enriched oxygen liquid is rectified by vapors rising through the column, and the vapors are further rectified by contact with liquid nitrogen, supplied as hereinafter explained, in the upper trays of the column. An effluent consisting of nitrogen escapes through the pipe 15 and liquid oxygen descends into a deep tray 16 from which it overflows through a passage 17 into a second tray 18. From the second tray, the liquid descends through an overflow pipe 19, into the bottom of the column. Thus, liquid oxygen is maintained in three separate bodies, avoiding thereby the temperature difference which would result from the maintenance of a deep pool of liquid at the bottom of the column.

In order to maintain the rectification and to eliminate nitrogen from the system, it is necessary to vaporize some of the liquid oxygen and at the same time to condense nitrogen necessary for use as a reflux in the columns 6 and 12. For this purpose, I provide horizontal, U-shaped condenser tubes 20, 21 and 22 which are connected to closures 23, 24 and 25 which may be secured in any suitable manner to the wall of the column so that the tubes 20, 21 and 22 project through openings in the wall of the column into the trays 16 and 18 and into the space below the tray 18. Thus, whenever it is necessary to repair the condenser tubes 20, 21 and 22, they may be removed from the column without otherwise dismantling the structure except for separation of pipe connections.

Connected to the tubes 20, 21 and 22 are headers 26, 27 and 28 having partitions 29, 30 and 31, therein. Pipes 32 and 33 connect the headers 26, 27 and 28. The partitions 29, 30 and 31 direct the flow of nitrogen supplied through the pipe 9 in series through the tubes 20, 21 and 22 so that the nitrogen is cooled in the tubes and eventually liquefied by heat exchange with the oxygen liquid surrounding them. This liquid nitrogen is delivered to a pipe 34 and a portion thereof is diverted through a pipe 35 and pressure reducing valve 36 to the top of the column 12, affording the necessary reflux liquid therein. The remainder of the liquid nitrogen is delivered through a pipe 37, pump 38 and pipe 39 to the top of the auxiliary column 6, affording the reflux liquid to effect rectification in the latter column.

As the result of vaporization of liquid at the bottom of the column 12, substantially pure oxygen in the vapor phase may be withdrawn through the pipe 40, or liquid oxygen may be withdrawn through the pipe 42 controlled by a valve 43. If oxygen of lower purity, suitable for many industrial operations, is desired, it may be withdrawn through a pipe 41 at a level of the column somewhat above the tray 16. The purity of this oxygen will vary somewhat, depending upon the position selected for the pipe 41. A purity of approximately 90% more or less is available through this pipe, and such oxygen can be produced on a large scale quite inexpensively and is therefore available for many uses where low cost oxygen which is not necessarily pure can be utilized.

As indicated, the invention is directed primarily to apparatus of large capacity, and to structural improvements facilitating construction and maintenance of such apparatus. The improved condensers, which may be removed and replaced readily, facilitate the operation of such apparatus and are especially desirable in equipment of the type described.

Various changes may be made in the details of construction as described without departing from the invention or sacrificing the advantages thereof.

I claim:

1. In an apparatus for the separation of gaseous mixtures by liquefaction and rectification, a column having a plurality of rectification trays, a plurality of trays of substantial depth below the rectification trays, horizontally disposed and laterally removable condenser tubes in the latter trays and connections to the tubes to introduce gas to and to withdraw condensate from the tubes.

2. In an apparatus for the separation of the constituents of gaseous mixtures by liquefaction and rectification, a primary column having a plurality of rectification trays, a plurality of trays of substantial depth below the rectification trays, horizontally disposed condenser tubes in the latter trays, an auxiliary rectification column, means for delivering the gaseous mixture to be treated to the auxiliary column, means for delivering liquid produced in the auxiliary column to the primary column, means for delivering the gaseous effluent from the auxiliary column to the horizontal condenser tubes and means for delivering the condensate therefrom to both of the columns.

3. In an apparatus for the separation of the constituents of gaseous mixtures by liquefaction and rectification, a primary column having a plurality of rectification trays, a plurality of trays of substantial depth below the rectification trays, horizontally disposed and laterally removable condenser tubes in the latter trays, an auxiliary rectification column, means for delivering the gaseous mixture to be treated to the auxiliary column, means for delivering liquid produced in the auxiliary column to the primary column, means for delivering the gaseous effluent from the auxiliary column to the horizontal condenser tubes and means for delivering the condensate therefrom to both of the columns.

4. In an apparatus for the separation of the constituents of gaseous mixtures by liquefaction and rectification, a primary column having a plurality of rectification trays, a plurality of trays of substantial depth below the rectification trays, horizontally disposed condenser tubes connected in series in the latter trays, an auxiliary rectification column, means for delivering the gaseous mixture to be treated to the auxiliary column, means for delivering liquid produced in the auxiliary column to the primary column, means for delivering the gaseous effluent from the auxiliary column to the horizontal condenser tubes and means for delivering the condensate therefrom to both of the columns.

WOLCOTT DENNIS.

REFERENCES CITED

The following references are of record in the file of this patent:

UNITED STATES PATENTS

| Number | Name | Date |
|---|---|---|
| 9,317 | Delescluze | Oct. 12, 1852 |
| 2,343,646 | Dinley | Mar. 7, 1944 |

FOREIGN PATENTS

| Number | Country | Date |
|---|---|---|
| 16,615 | Great Britain | Apr. 27, 1903 |